United States Patent Office 3,158,539
Patented Nov. 24, 1964

3,158,539
LAXATIVE COMPOSITION CONTAINING GLEDITSIA MUCILAGE AND METHOD OF USING SAME
Roland Y. Mauvernay, Riom, France, assignor to Laboratoire d'Analyses et de Recherches R. Y. Mauvernay, Riom, France
No Drawing. Filed Dec. 5, 1960, Ser. No. 73,508
2 Claims. (Cl. 167—56)

This invention relates to gleditsia mucilage and to a method of producing the same, and more particularly to the extraction of mucilage from the berries of the genus of gleditsia plants, and still more particularly from the berries of the *Gleditsia triacanthos* L. and from the *Gleditsia ferox* L. trees.

It is a primary object of the present invention to provide a new mucilage of plant origin, and also to provide a method of producing the same.

It is yet another object of the present invention to provide a mucilage of the genus of gleditsia plants, which mucilage has very valuable properties.

Other objects and advantages of the present invention will be apparent from a further reading of the specification and of the appended claims.

With the above and other objects in view, the present invention mainly comprises gleditsia mucilage and the method of producing the same which comprises extracting the berries of plants of the gleditsia family by means of water, and more particularly by means of boiling water and drying the thus formed aqueous extract to obtain the powdery gleditsia mucilage.

The gleditsias are trees of the family Leguminosae which are found in Europe, particularly in the south of France, in Italy and in Spain and which are also found in America. One of the most common American plants of this family is the well known honey locust.

The berries of these trees are contained in a pod having a dark red color and being about 20–25 cm. in length.

The berries are oval and flat. They are about 1 cm. long, about 7 mm. wide and several millimeters thick. Their color is brownish and they are rather hard.

When a cut is made through the bean, there are three distinguishing parts: on the exterior there is a brown cuticle which envelops two cotyledons and an embryo is distinguished between these two cotyledons.

The mucilage is contained in the layer of cells around the cotyledons.

The content of mucilage in these berries is particularly high and appears to be rather constant along the order of about 30%.

The mucilage of the gleditsia according to the present invention is of the cellulose-pectose type. In this respect it is somewhat analogous to lin mucilage (obtained from *Linum usitatissimum* L.) and to psyllium mucilage (obtained from *Plantago psyllium* L.)

When the gleditsia mucilage of the present invention contacts water it swells and then it dissolves entirely. It is insoluble in organic solvents and it is precipitated from aqueous solutions by ethyl alcohol or the like.

The gleditsia mucilage of the present invention does not contain starch and does not have any reducing properties. The gleditsia mucilage of the present invention is a complex polyuronic consisting essentially of a plurality of glycuronic acid units, and it is perfectly stable. The absence of any reducing sugar and of starch permits the production of a perfectly stable mucilage which can stand for long periods of time because it does not ferment.

As a matter of fact the presence in the gleditsia mucilage of the present invention of cells either from the cuticule or from the cotyledon does not have any deleterious effect on the stability of the mucilage because neither of these two portions of the berries contains either starch or reducing sugar.

Among the further properties of the gleditsia mucilage of the present invention is the fact that it is resistant to acid hydrolysis. It is in fact necessary to hydrolyze the gleditsia mucilage at a pH of 1 for about 7 hours in order to hydrolyze it. Consequently, the mucilage is not altered by the acidity of the stomach and this property gives the same an interesting use in this respect, for example, as a laxative.

The following example is given to illustrate the method of producing the gleditsia mucilage of the present invention. The scope of the invention is not, however, meant to be limited to the specific details of the example.

*Example*

Berries from *Gleditsia triacanthos* are pulverized, then heated with 4 times their weight of water in a boiling water bath for 4 to 5 hours.

It is then macerated for 24 hours and the mixture is then again heated for 4 to 5 hours in a boiling water bath. The mass is then pressed through a sieve of a size corresponding to the French pharmacopoeia modulus 28. The residue is again heated with 4 times its weight of water in a boiling water bath from 4 to 5 hours, the resulting mixture is then macerated for 24 hours and pressed through a sieve of the same size. (In certain cases, it is desirable to make another extraction under the same conditions however utilizing 2 times the weight of water.)

The viscous pseudo-solutions obtained by pressing through the sieves are mixed and then filtered through a sieve of modulus 26, and subsequently through another sieve of modulus 24.

The viscous pseudo-solutions obtained by passage through the sieves are evaporated under vacuum without exceeding a temperature of 52° C. It is also possible to atomize the pseudo-solution to obtain the desired powder.

The resulting gleditsia mucilage product is in the form of a powder containing about 8% water and the yield amounts to about 20 to 25% of the weight of the berries originally used.

The resulting product is in the form of a bright greyish-brown powder. It is extremely stable and is not hygroscopic. When put in contact with water it swells giving a jell. It is possible to regulate the degree of swelling by adjusting the quantity of water. The dry product forms a pseudo-solution in the water. Due to the absence of reducing sugars and starch even the aqueous solution is stable. The pH of a 2% solution is between 4 and 5. The absence of oxidases and peroxidases excludes all possibilities of incompatibility.

The ash content is about 11%. The control of the mucilage is made by identification of the sugars by chromatography on paper and by determination of the reducing sugars after hydrolysis by the method of Bertrand.

The following indicates the chromatographic identification of the mucilage of the present invention, which is found to be a polyuronic mucilage containing as its principal component glycuronic acid.

The mucilage obtained as described above is solubilized by violent agitation for 1 or more days until complete dissolution of all particles. A mixture of equal parts of the solution with normal hydrochloric acid is heated to refluxing for 7 hours in a water bath.

50 cc. of the resulting mixture is filtered and this hydrolysate is evaporated in a content of cold air. The dry residue is subsequently taken up in 5 cc. of distilled water.

The same is then subjected to paper chromatography using Whatman 4 paper and utilizing butanol-pyradine-water in a ratio by volume of 1:3:2 as the solvent. The paper chromatography proves the presence of glycuronic acid, galactose, glucose and mannose.

It is possible in accordance with the present invention to vary the water concentration of the gleditsia mucilage within rather wide limits thereby offering the possibility of varying the degree of swelling of the mucilage. This is particularly valuable in the case of the use of the mucilage as a laxative since with a water content of 8 to 10% the swelling of the product in the water of the intestines with an increase in volume of the intestinal bowl causes an excellent laxative effect.

With a more hydrated mucilage a rapid jelling occurs in the water of the stomach which thereby permits the use thereof as an appetite satient.

Comparison of the gleditsia mucilage of the present invention with psyllium mucilage has proved the superiority of the gleditsia mucilage in many important respects.

Gleditsia mucilage, as pointed out above, forms viscous solutions in water or even jells, depending on the concentration. The viscous solutions and the jells have a strong affinity for water with which they rapidly mix in perfect homogeneity. Contrary thereto, gelatinous solutions of psyllium do not mix well with water and it is necessary to use repeated agitations in order to form such solutions. It is therefore apparent that gleditsia mucilage has a much greater power of absorption of water than that of psyllium.

Furthermore, the laxative action of gleditsia mucilage is superior to that of psyllium mucilage which is a known laxative. If psyllium mucilage is given in view of its swelling power the maximum swelling is obtained in about 1 hour at ordinary temperature. It is therefore apparent that the swelling is produced in the stomach liquid and not in the liquid of the intestines. It is therefore not possible to increase the volume of the intestinal bowel by adsorption of water and the laxative power of the psyllium mucilage is therefore principally due to an emollient effect.

Contrary thereto, the gleditsia mucilage of the present invention when used as a laxative only swells very slightly in the liquid of the stomach and its maximum swelling is only obtained in about four to eight hours, so that the adsorbent power is present in the water of the intestine.

As a result, the laxative effect of the gleditsia mucilage of the present invention is substantially greater than that obtained with psyllium mucilage.

It is thus apparent that the gleditsia mucilage of the present invention is a highly effective laxative and may be used in such manner. It may be used for chronic constipation and also to regulate the intestine. Used as a laxative it may be given in the form of dragées, or in the form of granules. The gleditsia mucilage may be given alone or associated with known purgatives in order to increase the speed of its action.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of relieving constipation which comprises orally administering to a patient suffering from constipation gleditsia mucilage extracted aqueously from the berry of a gleditsia plan and having a water content of between about 8–10% by weight.

2. A laxative composition containing as an active component gleditsia mucilage extracted from the berry of a gleditsia plan and having a water content of between 8–10% by weight.

References Cited in the file of this patent

Ellis: The Journal of Biological Chemistry, volume 141, October 1941, pages 147–154.
Kucera: Chem. Abst., vol. 51, page 3928a, 1957.
Rahkimova: Chem. Abst., vol. 49, 1955, page 1281a.
Anderson: Industrial and Engineering Chemistry, vol. 41, No. 12, December 1949, pages 2887–2890.
Anderson: J.A.P.A. (Sci. Ed.), vol. 42, No. 11, November 1953, pages 662–664.